June 23, 1925.
J. R. PATTON
TRANSMISSION LUBRICATOR
Filed Dec. 16, 1922
1,543,613
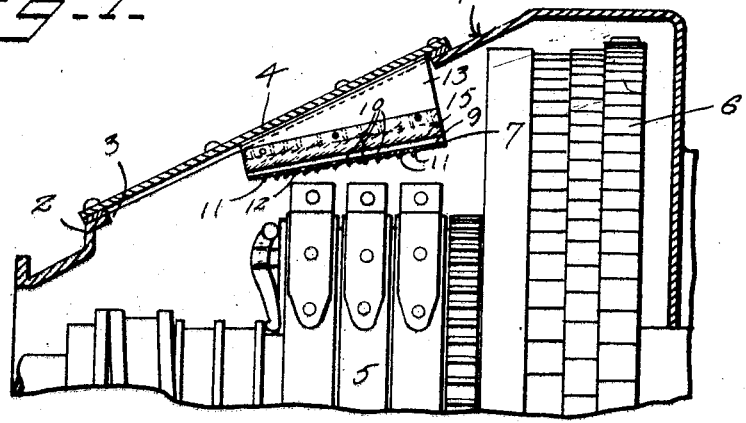
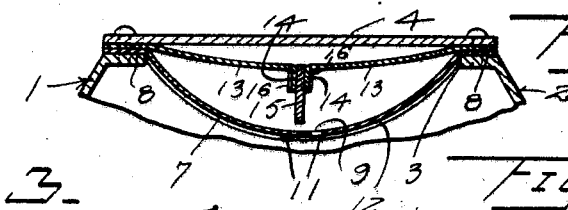
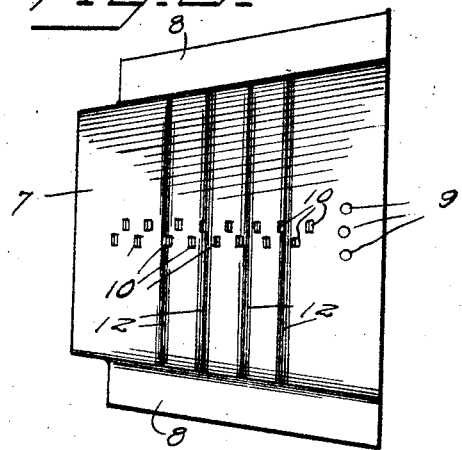
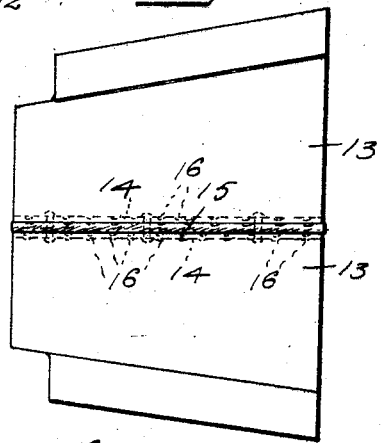
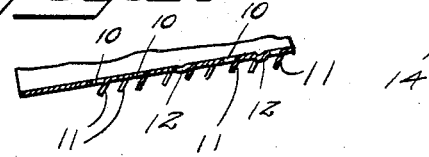
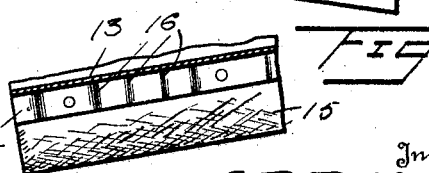
Inventor
J. R. Patton.
By
Attorney Patented June 23, 1925.

1,543,613

UNITED STATES PATENT OFFICE.

JOHN R. PATTON, OF HAYNESVILLE, LOUISIANA.

TRANSMISSION LUBRICATOR.

Application filed December 16, 1922. Serial No. 607,434.

*To all whom it may concern:*

Be it known that I, JOHN R. PATTON, a citizen of the United States, residing at Haynesville, in the parish of Claiborne and State of Louisiana, have invented certain new and useful Improvements in Transmission Lubricators; and I do hereby declare the following to be a full, clear, and exact description of the invention, such as will enable others skilled in the art to which it appertains to make and use the same.

The invention relates to lubricating means for oiling the transmission of motor vehicles and has for its primary object to insure a positive distribution of the oil while the motor is running and for a short time after the motor has ceased to operate.

The invention is particularly adapted for transmission of the planetary type including a fly wheel, both the transmission and fly wheel being encased and usually oiled by means of the fly wheel which runs in oil and splashes and distributes the same.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a vertical longitudinal section of a transmission housing illustrative of the invention, the transmission being shown in full lines and the lubricator being in section, Figure 2 is a vertical transverse section of the parts illustrated in Figure 1, Figure 3 is a top plan view of the lower member comprising the lubricator, Figure 4 is a sectional detail thereof, Figure 5 is a top plan view of the upper member of the lubricator, and Figure 6 is a detail view of a portion thereof.

Corresponding and like parts are referred to in the following description and designated in the several views of the drawings by like reference characters.

The numeral 1 designates the lower portion of the transmission housing and 2 the cover which is bolted thereto and provided in its top with an opening 3 which is closed by means of a plate 4 retained in place by means of bolts. The numeral 5 designates the planetary transmission and 6 the fly wheel associated therewith. These parts are of well known construction and arrangement and are illustrated to demonstrate the application of the invention which resides in the means whereby lubricant is supplied to the transmission.

The lubricator comprises upper and lower members which are disposed in the opening 3 of the transmission cover and clamped between said cover and the plate 4. The lower member of the lubricator comprises a shallow trough 7 having outwardly disposed flanges 8 along its sides to rest upon the cover 2 upon opposite sides of the opening 3. Two sets of openings 9 and 10 are formed in the bottom of the trough 7, the openings 9 being at the front end of the trough 7 and the openings 10 extending throughout the remainder of the length of the trough and having depending lips 11 to insure distribution of the oil. Grooves 12 are formed in the trough 7 upon opposite sides of the medial bottom portion in which the openings 9 and 10 are formed. The grooves 12 have a transverse arrangement and serve to direct the oil towards the medial bottom portion of the trough to insure its delivery through the openings 10.

The top member of the lubricator comprises similar plates 13 which are clamped between the plate 4 and the cover 2. The plates 13 have depending flanges 14 along their inner or abutting longitudinal edge portions and a wick or absorbent strip 15 is clamped between the flanges 14. The flanges 14 have vertical grooves 16 which provide for a ready passsage of the oil in the practical operation of the lubricator. The wick 15 or absorbent strip is adapted to hold a quantity of oil which discharges slowly for some time after the motor has ceased to run, thereby insuring a supply of oil to the transmission after the engine has come to a stop. The wick or absorbent strip 15 depends from the top member and is disposed over the medial bottom portion of the trough 7 in which the openings 9 and 10 are formed.

In practice, the oil from the bottom of the transmission housing is supplied to the lubricator by means of the fly wheel 6 and escapes slowly through the openings 9 and 10 and is supplied to the transmission throughout its length. While the motor is running, the wick or absorbent strip 15 is supersaturated with the oil supplied to the lubricator and when the engine is brought to a stop, the excess of oil contained in the part 15 slowly discharges into the trough 7 and escapes through the openings 9 and 10 and lubricates the transmission for some time after the engine has ceased to run.

What is claimed is:

1. A lubricator of the character specified comprising a trough-shaped member having a plurality of delivery openings therein, inclined and depending lips arranged adjacent said openings, another trough-shaped member arranged above the first mentioned member and comprising mating members, and absorbent material secured between the meeting edges of said mating members and arranged to deliver lubricant to the first mentioned member.

2. In combination, a transmission, a fly wheel associated therewith, a housing enclosing the transmission and fly wheel and adapted to contain a quantity of oil in its lower portion, and a lubricator disposed in the upper portion of the housing and supplied with oil by means of said fly wheel and adapted to distribute the oil to the transmission, said lubricator comprising a lower member having outlet openings throughout the length of its bottom portion, and a top member having an absorbent strip depending therefrom to hold a quantity of oil which is slowly discharged for lubricating the transmission for some time after the engine has ceased to run.

3. A lubricator of the character specified, comprising a lower trough-shaped member having outlet openings throughout the length of its bottom portion and having outwardly extending flanges along opposite sides and provided with transversely arranged grooves at opposite sides of the bottom portion, and an upper member comprising similar plates having flanges depending from their inner longitudinal edges, said flanges having vertical grooves therein, and an absorbent strip clamped between said flanges and depending therefrom and adapted to contain a quantity of oil which is slowly discharged for some time after the supply thereto has ceased.

4. In combination, a transmission, a fly wheel associated therewith, a housing inclosing the transmission and fly wheel and adapted to contain a quantity of oil in its lower portion, and a lubricator disposed in the upper portion of the housing and supplied with oil by means of said fly wheel when the same is being driven, said lubricator including an absorbent strip to hold and distribute the oil.

5. A lubricator of the character specified comprising a lower trough shaped plate having outlet openings throughout the length of its bottom portion, and an upper member including absorbent material.

In testimony whereof I affix my signature in presence of two witnesses.

JOHN R. PATTON.

Witnesses:
 G. S. RANKIN,
 F. K. FALLEY.